United States Patent Office 3,427,427
Patented Feb. 11, 1969

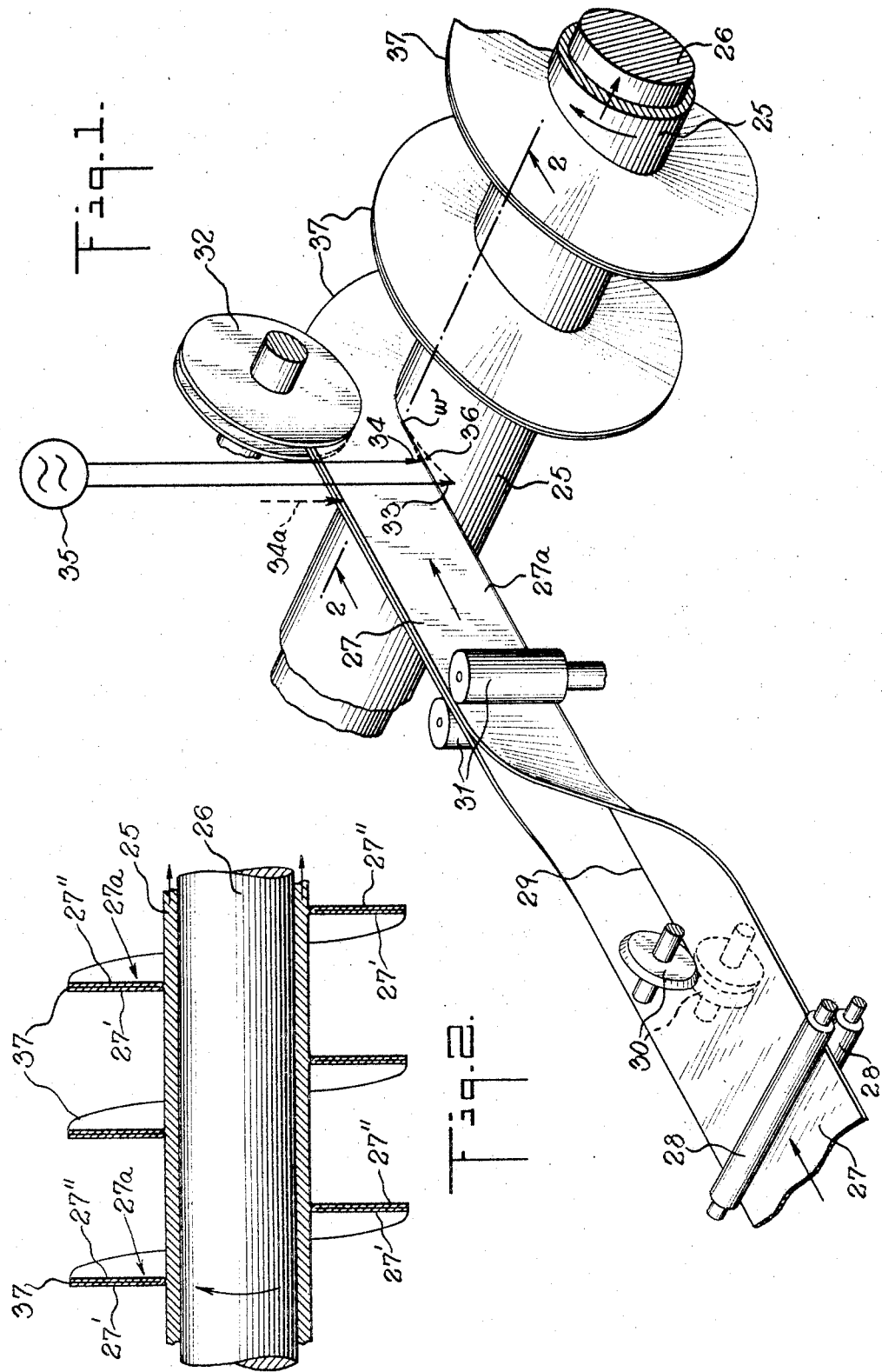

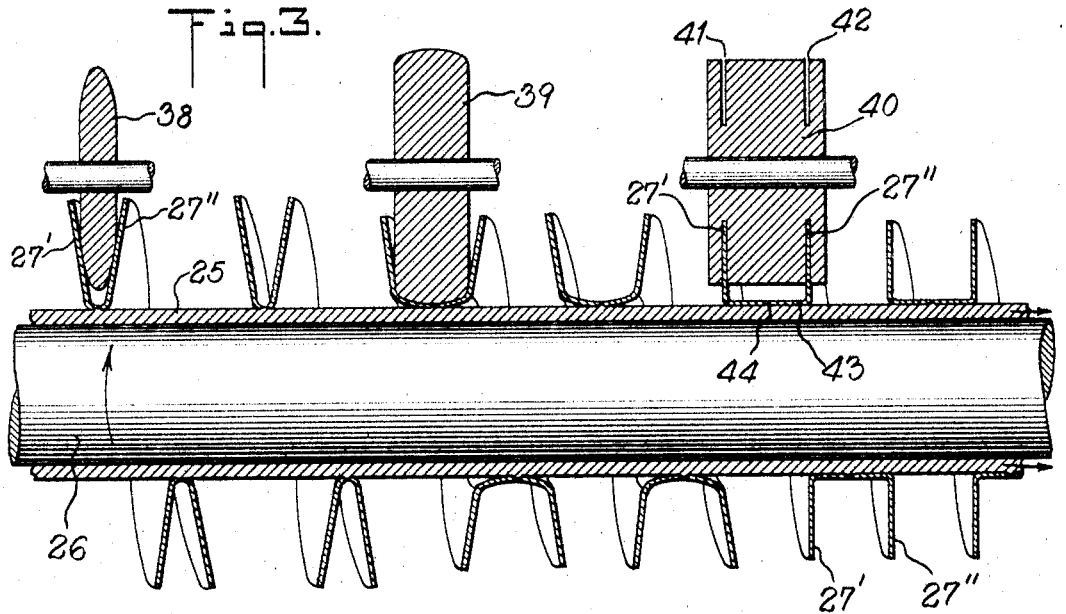
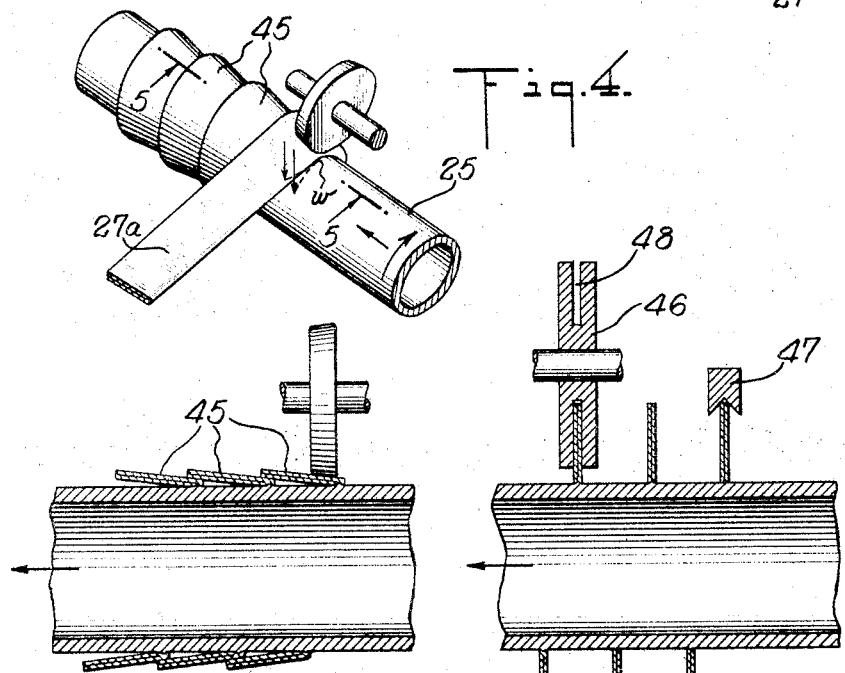

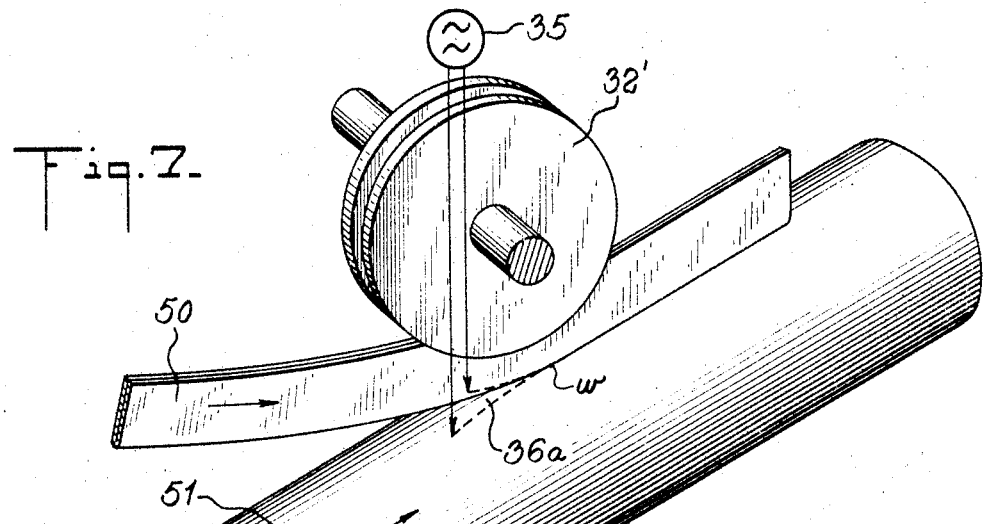
Fig. 7.
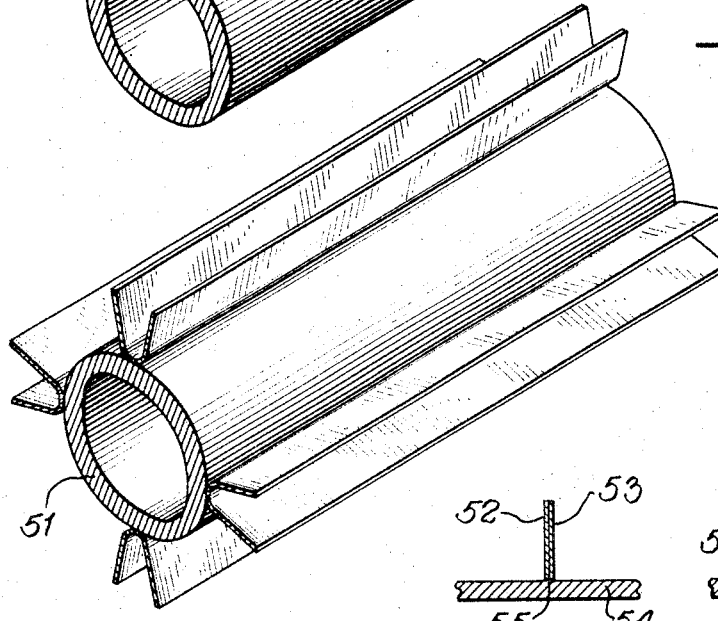
Fig. 8.
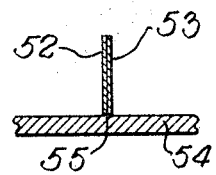
Fig. 9.
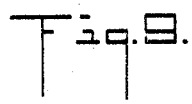
Fig. 10.
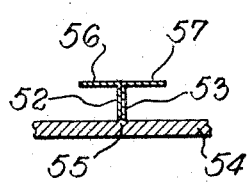
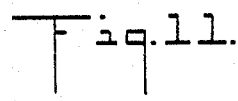
Fig. 11.

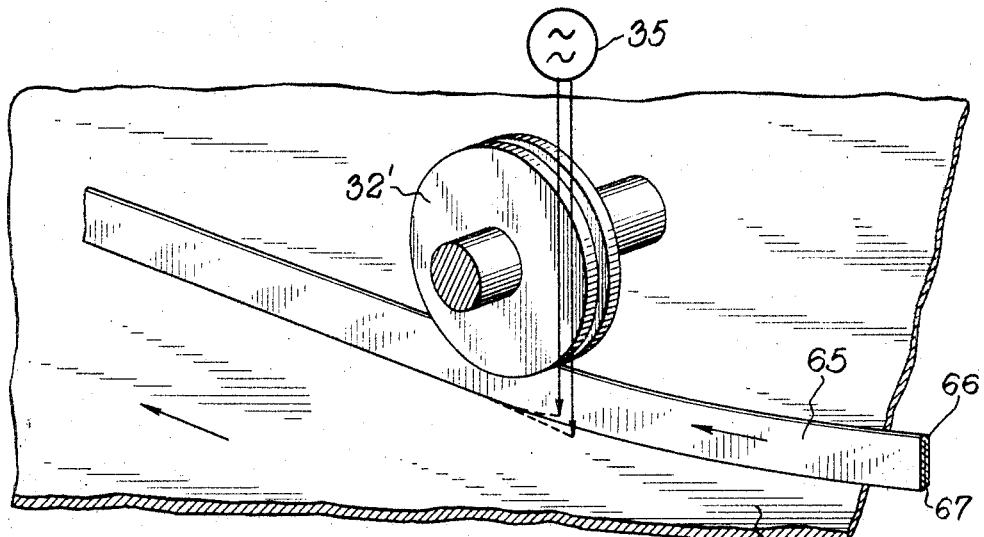
Fig. 12.
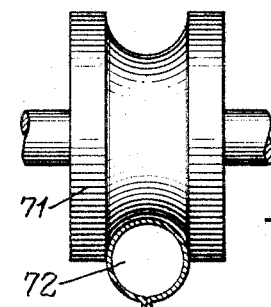
Fig. 14.
Fig. 13.
Fig. 15.
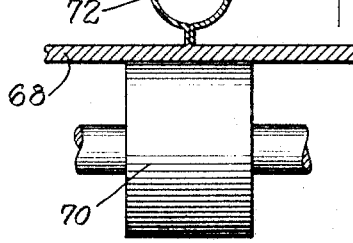
Fig. 16.
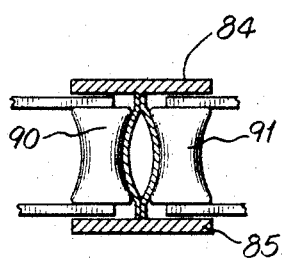
Fig. 18.
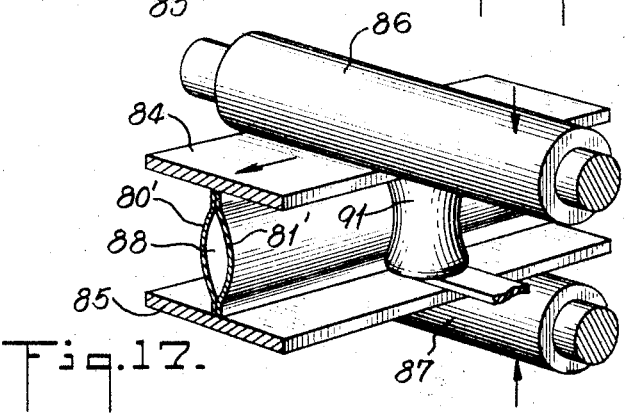
Fig. 17.

3,427,427
WELDING METAL PARTS
Wallace C. Rudd, Larchmont, N.Y., assignor to American Machine & Foundry Company, New York, N.Y., a corporation of New Jersey
Filed Dec. 4, 1964, Ser. No. 415,911
U.S. Cl. 219—107
Int. Cl. B23k *11/00, 19/00*
14 Claims

ABSTRACT OF THE DISCLOSURE

Process and apparatus for producing a shaped integral member of thin strip metal having spaced-apart surfaces which is welded to another member in which the thin strip metal is, prior to being welded to the other member, folded upon itself so as to have mutually-supporting, contacting surfaces and while so folded is advanced with the other member and heated and pressed into welded engagement at an edge with the other member. Thereafter, pressure is applied to the so folded strip to cause separation of at least portions of the previously contacting surfaces.

---

This invention relates to methods and apparatus for welding metal parts, and more particularly for the welding of fin or web-like metal strip means edgewise onto other metal areas.

Methods and apparatus have heretofore been put into use for welding strips or the like, such as metal radiating fins, edgewise with respect to supporting surfaces therefore which are either flat, curved, or in the form of tubing. For example, by the use of high frequency resistance heating, helically-extending fin means are welded about lengths of tubing, or longitudinally along tubing, to mention two examples.

However, such methods involve serious difficulties when it is attempted rapidly, uniformly and securely to weld quite thin strips edgewise onto a supporting surface, because such thin material, particularly the edges thereof, is difficult properly to control in position and to protect against deformation, especially when moving quite rapidly while being applied under the necessary pressure at the weld point, and also difficulties are involved in uniformly heating, and avoiding over-heating and distortion of the edges.

According to the present invention, it has been found possible to overcome these difficulties by concurrently advancing flatwise against each other, two thicknesses of this thin fin or strip material on edge up to the weld point, where, by the use of high frequency current conductively or inductively applied, the plurality of edges are concurrently welded in place. Thereafter the pair of thin strips, except where their edges are welded to the supporting member, are deformed in various ways so as to separate the layers, thereby to provide a plurality of radiating fins, or to provide structures adapted for other purposes, as hereinafter described.

In a typical case, in accordance with the present invention, a relatively wide strip of fin material is first sharply folded over upon itself to provide a strip of double thickness, and thereupon the outer surface of the edge at the fold line, may be welded either helically about a pipe or tube, or longitudinally along any desired element. Thereafter the two folded-over layers are suitably reshaped to form two spaced-apart radiating fins, for example.

According to another example, instead of folding over a strip upon itself, two strips in contact with each other may be used and the edges thereof welded to a supporting member and the strips at their edges opposite the weld thereafter may be reshaped and spaced apart to various extents, or in various ways, for efficient radiating or other purposes.

With another example of the invention, the folded-over strip of double thickness, after its two exposed edges are welded to a support, may be so expanded that the two thicknesses form the opposite walls of a tube, for example a radiating or heat transfer tube welded in place on a support.

In other cases, a pair of coextensive strips may be used to form a web of double thickness, the double thickness edges of which may be welded to flanges to form a lightweight, strong structural element, and preferably thereafter the web thicknesses are deformed so as to become separated along their midportions to form a generally tubular web of increased strength.

By utilizing the present invention, it has been found possible to weld quite thin strip or fin material, for example, 0.010 to 0.026 of an inch thick, to provide a helical radiating fin on tubing of quite small diameter, for example down to ⅝ of an inch in diameter, and to do so at great speeds of for example 80 to 200 feet per minute. With the other embodiments of the invention, similarly severe conditions may be overcome. In each case, the provision in effect of a strip of double thickness makes it possible for one thickness in substance to reinforce and lend rigidity to the other, particularly at the edges, and affords the strips a wider and thus more secure welded base which is less subject to flexure and disruption. Furthermore, since two superposed edges of the fin material are being heated simultaneously, there is less danger of irregularities in the heating and possible overheating at various points. These factors are believed all to cooperate in contributing to the highly successful and uniform operation of the invention at great speeds. As above indicated, the heating current for welding purposes is supplied from a high frequency source, either inductively or by contacts engaging the approaching portions of the workpieces shortly in advance of the weld point.

Heretofore it has been proposed to weld fin material of a broad-based U-shaped cross-section helically around a pipe or the like by applying ordinary alternating or direct current by way of an electrode extending into the base portion of the U-formation, for causing the current to flow through the metal of such base portion, and thence through or along a wall of the pipe to another electrode. While this provides a pair of spaced-apart fins, yet one fin of the pair has no possibility of reinforcing or lending rigidity to the other during the welding operation, and furthermore, welding by that method is slow, irregular and necessitates softening the entire thickness of the fin metal along the weld, with consequent proneness to irregularities and deformations.

Various further and more specific objects, features and advantages of the invention will appear from the description given below, taken in connection with the accompanying drawings, illustrating by way of example preferred forms of the invention.

In the drawings:

FIG. 1 is a somewhat diagrammatic perspective view showing the invention as applied to the problem of welding thin fin material of double thickness helically about a rotating and relatively-advancing tube;

FIG. 2 is a vertical cross-sectional view of a portion of the tubing with a helically-extending fin welded thereto;

FIG. 3 is a vertical sectional view, somewhat diagrammatically illustrating the apparatus for separating and reshaping the two thicknesses of the fin material after same have been welded in place as in FIG. 1;

FIG. 4 is a view somewhat similar to FIG. 1, but showing an alternative method of initially welding the double thickness fin material in place;

FIG. 5 is a vertical sectional view, taken substantially along line 5—5 of FIG. 4;

FIG. 6 is a somewhat diagrammatic vertical cross-sectional view of apparatus arrangements for repositioning or reshaping the fin material after being welded as per the method of FIG. 4;

FIG. 7 is a somewhat diagrammatic perspective view showing another embodiment of the invention as applied to the problem of welding the thin fin material longitudinally to an advancing length of tubing;

FIG. 8 is a view showing a portion of the tubing with several of the fin elements welded along same and after the two thicknesses of each fin have been separated to provide separate spaced-apart radiating fins;

FIG. 9 is a vertical cross-sectional view showing a strip or fin of double thickness as initially welded along its lower edges to a support;

FIGS. 10 and 11 illustrate two examples of ways in which the two leaves of the fin of FIG. 9 may be partially deformed and spaced apart to form modified shapes for various purposes;

FIG. 12 is a view similar to FIG. 7, but illustrating an embodiment of the invention in which the folded-over double thickness of fin material is welded to a supporting member along the edges opposite from the fold, thereby to provide a fin, when welded in place, which will be of the form shown in cross-section in FIG. 13.

FIG. 14 is a view illustrating apparatus by which the welded fin of FIG. 13 may be reshaped to form tubing welded in place as per the cross-sectional view thereof in FIG. 15;

FIG. 16 illustrates an example of the invention where a double thickness strip material is welded along its upper and lower edges to flanges respectively, thereby to form a structural element;

FIG. 17 is a diagrammatic perspective view illustrating the manner in which such element may be compressed, whereby the double thickness web becomes deformed to a tubular cross-section; and FIG. 18 is a cross-sectional view showing the manner in which the web material may be controlled during such deformation.

Referring now in further detail to FIG. 1, there is here shown a length of metal tubing 25 being rotated and longitudinally advanced, as indicated by the arrows, while supported for example on a mandrel 26. A strip of metal 27 is shown while being advanced or guided by a pair of rollers 28. As the strip is advanced, it may be longitudinally scored or bent along its center line 29, as by engagement by a pair of upper and lower creasing rollers 30, preparatory to the strip becoming folded over upon itself as it passes through the nip of a pair of rollers 31, thereby providing a double thickness strip, sharply folded over upon itself along the line 29. This strip is further advanced while being guided by the rollers 31, as by a grooved roller 32 and such other rollers as may be necessary, into a position whereby its lower or folded-over edge tangentially engages the pipe or tube 25 at a weld point w. High frequency heating current is applied with the particular example here shown, as by contacts at 33, 34 connected to a source of high frequency current 35. Contact 33 is applied to the tube 25 at a point spaced from the lower edge of the strip 27a, whereas the contact 34 may be applied either at a point near the lower edge of the strip and in advance of the weld point, or, if preferred, to the upper edge of the strip at a point such as indicated by the dotted lines at 34a. In either case, the high frequency current will flow from the contacts 33 and 34 (or 34a) to and from the weld point, causing the opposed metal portions on opposite sides of the gap, indicated at 36, and on the very surfaces thereof only, to become heated to welding temperature when same come into engagement at the apex of the gap, viz at the weld point w. In case a contact is used, positioned as at 34a, the current will flow therefrom down across on the surface of the strip 27 to the lower edge of the strip, and thence along such edge to the weld point, and this will result in heating the upper edge portions of the double strip 27 to a considerable extent, facilitating stretching the metal as it is wound helically into place, and thereby aiding in preventing wrinkling of the quite thin metal which this invention is particularly adapted to accommodate. The outer or uppermost edges, due to the skin effect with high frequency current, will thus become somewhat more heated than the middle or intermediate portions of the strip, as is desirable to promote proper stretching of the metal, whereas the lower strip edge just in advance of the weld point, will become heated to the highest temperature, and to welding temperature, upon reaching the weld point. Such heating of the lower edge is due to the concentration of the current there, due to the proximity to the current path on the tube 25.

The current used may, for example, be of a frequency in the neighborhood of 50,000 cycles per second, or preferably a considerably higher frequency, such as 300,000 or 400,000 cycles per second, or even higher. With such frequencies, heating to welding temperature may be kept from penetrating much below the surfaces of the thin metal with which this invention is well adapted to be practiced.

Thus, in the manner above described, helical convolutions 37 of the double thickness folded-over strip become welded along the edges thereof to the peripheral surface of the tube 27 and in the manner shown in the sectional view of FIG. 2. As will be apparent from FIG. 2, both of the two thicknesses 27' and 27" of the fin will thereby in effect be welded to the tubing 25, and thus both are brought directly into good heat-conductive relation with the metal of the tubing 25. This form of welding may be accomplished as above indicated at very high speed and with a high degree of uniformity, without interruptions of the weld and without disturbing the crystalline structure and properties of the metal of the parts welded, other than on the very surface portions of the metal as welded, this being a result of the use of high frequency current which, at the gap 36 above referred to, is compelled to become highly concentrated, with consequent concentration of the heating closely within the very shallow depths of the metal. Thus a uniform, strong, welded relation will exist between the strip and the tube 25, permitting the strip safely to be reformed, in the ways hereinafter explained, without danger of fracture or disruption of the weld. At any point after the fins have been welded in place as per FIG. 1, the strip may be reshaped or deformed by use of means such as shown in FIG. 3. Thus first the double-thickness strip may be brought into engagement with a somewhat blunt-edged disc roller 38 which will serve somewhat to spread apart to a V-shaped relation, the two thicknesses 27' and 27". At a subsequent location, the formation may be led into engagement with a wider and a relatively blunt-edged roller 39, which serves to impart a relatively broad-based U-shaped formation to the fin material. Finally, at a subsequent location, a roller, as at 40, having two peripheral slots, as at 41, 42, may be brought into engagement with the thicknesses 27', 27" respectively, to impart thereto a parallel relationship, with each thickness vertically positioned and at right angles to the base portion indicated at 43, which will remain securely welded, as at 44, to the tube 25. The shapes and positions of these reforming rollers may, of course, be varied to secure by trial the best results. It may be noted that, in winding the helical turns initially about the tube 25, the pitch angle should preferably be such that the turns will be spaced apart by distances which will provide for a uniform spacing of all the resulting completed fins, such as appear at the right hand end of FIG. 3.

As shown in FIGS. 4 and 5, if preferred, the initially folded-over double-thickness fin strip 27 may be laid onto the tubing 25, with each convolution in a slightly inclined relation to the tubing, as best shown at 45 in FIG. 5. In this way, during the welding, the normally upper edge portions of each convolution may be so inclined as to bear against the preceding convolution to aid in stabilizing the position of the strip as it is being welded in place at high speeds. In other respects, the welding (as per FIGS. 4 and 5) may be accomplished in the manner above explained in connection with FIG. 1. At some subsequent point after the convolutions have been welded into place, as in FIG. 5, they may be brought into vertical positions by being guided into engagement by tools, such as indicated at 46 and 47, element 46 being in the form of a roller having a narrow groove 48 closely embracing the double-thickness strip. Afterwards, the strip thicknesses may be separated in the same manner as above explained in connection with FIG. 3.

FIG. 7 illustrates the manner in which a double-thickness folded-over strip 50 may be welded longitudinally along a tube 51, for example, the high frequency current being applied in the same manner as above explained in connection with FIG. 1, so as rapidly to heat the surfaces on opposite sides of the V-shaped gap 36a to a welding temperature upon reaching a weld point w. After strips are welded in place, as shown in FIG. 7, the two thicknesses thereof may be spread apart as by the use of rollers similar to those of FIG. 3. A plurality of the strips may, of course, be welded along different elements of the tubing, as shown in FIG. 8, and in any desired spaced-apart relationship.

While with the examples above described, a folded-over double-thickness strip is welded in place along the fold line, the principles of the invention may also be applied in cases where it is desired to use two coextensive strips in contact throughout, as shown at 52 and 53 in FIG. 9, instead of using a single folded-over strip. Here, by welding methods like those above explained, the lower edges of these two strips may both be welded to a base or supporting member 54, the narrow band or area along which the welding occurs being indicated at 55. Usually the weldment will be such as also to weld one strip at its lower edge to the other, as well as to the member 54.

Thereafter, by the use of suitably-shaped rollers or other tools, portions of the strip thicknesses 52, 53 may be reshaped so that they will be spaced apart, at least at their upper portions, as shown in FIG. 10 for example. Then, if desired, such upper portions may be reshaped as at 56, 57 to form oppositely-directed flanges, as in FIG. 11.

It may be here noted that the two thicknesses, as of FIGS. 9 to 11, if desired, may be formed of different metals, if for any reason that should be desired. The above-described welding operations may be performed whether the metals are ferrous or nonferrous, such as steel, aluminum, brass or copper.

With the embodiment shown in FIG. 12, a double-thickness folded-over strip 65 is shown as being welded to a metal base or supporting area 68 in a manner similar to the way in which the welding operations are carried out in FIGS. 1 and 7. However, here the fold line 66 of the strip metal is positioned uppermost, whereas the lower exposed edges, at 67, are being welded to the base 68. FIG. 13 shows in cross-section this form of double-thickness strip as thus welded in place. This provides a desirable method to use, where the strip thicknesses are to be later so reshaped as to become largely spaced apart to form opposed wall portions of tubing welded in place to a support. This may be accomplished, for example, by the use of rollers such as shown in FIG. 14. That is, the assembly as shown in FIG. 13 may be rapidly advanced over a supporting roller 70 and beneath a suitably grooved upper roller 71, which engages along a folded-over upper edge of the strip, and causes same to be pressed downwardly and expanded to the generally tubular formation shown at 72. A series of pairs of rollers such as 70 and 71 may be used if necessary. A cross-section of the resulting product is shown in FIG. 15, and it will be here noted that the tubing as thus formed and welded in place, will be carried upon two downwardly protruding lip-like portions, as at 73, 74, the lower edges of both of which are securely welded at 75 to the supporting plate 68.

Tubing formed and welded in place in this way is well adapted for carrying refrigerant fluids, such as in freezers, evaporators or ordinary refrigerators, and where in many cases the tubing may be of relatively small diameter, such as ⅜ of an inch. The tubing being welded in place to the support by a double-thickness lip portion 73, 74, has the possibility of excellent thermal transfer with respect to the support.

It may be noted that, usually in comparable situations, it has been the practice to use extruded metal tubing, because ordinarily longitudinally-welded tubing of such sizes could not be internally scarfed. Thus there would be left therein a bead produced by the weld and possibly embodying particles which would become detached, and these, if entrapped in small orifices of a refrigeration system, would render it inoperative. This has led to the use of extruded tubing requiring a relatively expensive extrusion operation, and in addition the extruded tubing has had to be welded in place by another and subsequent separate operation. Yet by the method above described in connection with FIGS. 12 to 15, the making of the tube and the welding of same in place, may in effect be accomplished in one operation, it being understood that the roller arrangement of FIG. 14 may be embodied in the same machine assembly as the welding means of FIG. 12. In addition to thereby avoiding the necessity of two separate operations, with the present invention there is no possibility that any upset metal at the weld will get into a refrigeration system, because the weld (as is clear from FIG. 15) is at the edges of the lips spaced from the cavity in the tube.

The welded tube formation of FIG. 15 has a further important advantage in that, when same is subjected alternately to expansion and contraction during melting and freezing temperatures, there will be no tendency for the tube to be torn away from its support. If, as with the prior practice, a tube of circular cross-section is welded in tangential contact with its support, ice will form around it and then, under melting conditions, the resulting water may be entrapped underneath the tubing at the crevices of the tangent, and when such water is refrozen, the resulting expansion forces tend to rip the tubing from the sheet. By having a slight fin extending down from the tube to the sheet, as shown in FIG. 15, such disruptive forces are minimized or eliminated. This method of forming and welding the tubing in place has the added advantage that the two operations may be conjointly performed at high speeds, such as up to 300 feet per minute, with the welding methods above described.

With the embodiment of the invention shown in FIG. 16, a double thickness strip, as at 80, 81, is shown as welded along its upper and lower edges 82, 83 respectively, to flanges 84 and 85, thus forming a structural element. The double-thickness web may first be welded to one of the flanges in the manner explained above in connection with FIG. 9, and previously, and then the upper edges of the web may be welded to the flange 84, or, if preferred, both welding operations may be carried out simultaneously. After the structure has been formed as shown in FIG. 16, same may be passed between a pair of upper and lower pressure rollers 86 and 87 and subjected to sufficient pressure whereby the two thicknesses of the web, as at 80' and 81' will be deformed by being bulged apart from each other, thereby providing a web 88, the midportions of which are hollow, and thus of tubular form of enhanced strength. During this deforming operation, the midportions of the web may be caused to come into engagement with suitably-shaped rollers 90, 91, which act to control and limit the degree of deformation to the desired extent, as best shown in FIG. 18. In some cases, if desired, the web thicknesses, before being welded in place, may be formed of the bulging shapes, such as indicated in FIGS. 17 and 18. The welding steps by the use of high frequency current may be performed in the manner disclosed in the co-pending application of Fred Kohler and Wallace C. Rudd, Ser. No. 365,578, filed May 7, 1964, entitled "Welding Assemblies of Elongated Members," reference to which is hereby made.

The embodiment of FIGS. 16 to 18 inclusive, provides a relatively inexpensive way of rapidly forming structural elements, which may be either of H, I or even T-shape in section, if desired, and which may be light in weight and strong, and well adapted for uses such as in aircraft and other vehicles, among other general purposes.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding relatively thin, elongated metal strip material on edge to a metal support and then reshaping such material to form a plurality of longitudinally-extending, spaced-apart areas thereof, such method comprising: providing the strip material in a form constituted of two thicknesses of the metal with their surfaces in mutually-supporting, contacting relation; rapidly advancing the strip material longitudinally with said surfaces in said relation while bringing an edge thereof into contact with a surface of the support which is also being advanced at the same speed; causing current of a frequency of about 50,000 cycles per second or higher to flow along on said edge and on said surface to heat same to welding temperature upon reaching a desired weld point; applying pressure to said material while said surfaces are still in said relation to bring said edge into welded engagement with said support at said point; and thereafter applying pressure to the advancing strip material in directions to force longitudinally-extending areas of the thicknesses which constitute same into spaced-apart relation, while same remain secured to said support by reason of said welded engagement.

2. Method in accordance with the foregoing claim 1 and in which the two thicknesses of metal constituting the strip material, are provided by folding over a single strip along a longitudinally-extending fold line intermediate the edges of the single strip, whereby the two side portions thereof are brought into said mutually-supporting, contacting relation, and the resulting edge formed along said line is brought into welded engagement with said support.

3. Method in accordance with the foregoing claim 2, and in which the pressure forcing the two thicknesses into spaced-apart relation is applied by advancing said thicknesses past a rotatable means engaging therebetween and acting to wedge same apart.

4. Method in accordance with the foregoing claim 2, and in which the pressure forcing the two thicknesses into spaced-apart relation is applied by advancing said thicknesses past rotatable means engaging therebetween and shaped to wedge same apart first with a gap therebetween of generally V-shaped cross-section and then a gap of generally U-shaped cross-section, the base portions of which are crowded down adjacent said support at the sides of the line of welded engagement.

5. Method for winding a length of metal strip material generally helically about a metal support while welding same on edge to said support, such method comprising: providing said strip material in a form constituted of two thicknesses of the metal with their surfaces in mutually-supporting contacting relation; advancing said strip material with said surfaces in said relation so as to bring an edge thereof substantially tangentially into engagement with said support at a weld point while the support is being relatively rotated and longitudinally advanced, and thereby forming the strip material into helical convolutions; causing current of a frequency of about 50,000 cycles per second or higher to flow along on said edge and on the surface of said support opposed to said edge in advance of said point to heat same to welding temperature upon reaching said weld point; applying pressure to said material while said surfaces are still in said relation to bring same into welded engagement; and thereafter applying pressure to the formed convolutions in directions to force at least portions of the two thicknesses which constitute same into spaced-apart relation while same remain secured to said support by reason of said welded engagement.

6. Method in accordance with the foregoing claim 5, and in which the pressure forcing the two thicknesses into spaced-apart relation is applied by advancing same past rotatable means engaging therebetween and acting to wedge same apart with a gap therebetween, first of generally V-shaped cross-section and then of generally U-shaped cross-section.

7. Method in accordance with the foregong claim 5, and in which the two thicknesses of metal constituting the strip material are provided by folding over a single strip along a longitudinally-extending fold line intermediate the edges thereof, whereby the two side portions thereof are brought into said mutually-supporting contacting relation and the resulting edge formed along said line is brought into welded engagement with the support.

8. Method in accordance with the foregoing claim 7, and in which successive helical convolutions of the folded-over single strip are caused to be wound about said support and brought into said welded engagement therewith, while each convolution is in an inclined position with respect to the support, and thereafter said convolutions are passed into engagement with guide means for bringing same into upstanding relation to the support.

9. Method in accordance with the foregoing claim 1, and in which the two thicknesses of metal constituting the strip material are provided by folding over a single strip along a longitudinally-extending median fold line, whereby the two side portions thereof are brought into said mutually-supporting, contacting and substantially coextensive relation; thereafter bringing the edge of said strip material opposite said fold line into said welded engagement with said support; and thereafter applying pressure to the advancing strip material at the regions thereon adjacent said fold line, thereby to force adjacent portions of the two thicknesses apart and thus to a tubular cross-section, from the periphery of which portions of the two thicknesses remain extended therefrom and secured to said support by reason of said welded engagement.

10. Method for forming tubing and welding same to a support therefor which comprises: advancing a metal strip which has been folded over upon itself along a median line, while also advancing said support into contact at a weld point with the free edge portions of said advancing strip opposite from said line; utilizing high frequency current in advance of said weld point to heat the contacting portions to welding temperature; and thereafter applying pressure to the regions on the strip along adjacent said fold line and in a direction toward the support, thereby to force portions of the strip into spaced-apart relation and into a tubular cross-sectional shape, while leaving in contact with each other portions of the two thicknesses thereof which are adjacent to and welded to the support.

11. Method for forming a structural element having a web formed of metal strip material welded along its edges respectively to metal flanges, such method comprising: providing said strip material in a form constituted of two coextensive thicknesses of the metal with their surfaces in mutually-supporting contacting relation; longitudinally advancing said strip material and said flanges while bringing the free edges of the strip material into contact at weld points respectively with the flanges; causing current of a frequency of about 50,000 cycles per second or higher to flow in advance of said points along on said edges and on surface portions opposed thereto on said flanges to heat same to welding temperature upon reaching the weld points; and thereafter applying pressure to the flanges in a direction to force at least portions of the two thicknesses of the web material into spaced-apart relation while same remain welded at their edges to the flanges, thereby to form a web of tubular cross-section.

12. Apparatus for welding relatively thin elongated metal strip material on edge to a metal support and then reshaping such material to form a plurality of longitudinally-extending spaced-apart areas thereof, such apparatus comprising; means for folding a metal strip upon itself with the surfaces of the folded portions in mutually-supporting, contacting relation; means for advancing longitudinally the so-folded metal strip while bringing an edge of the so-folded metal strip into contact at a desired weld point; with a surface of the support; means for also advancing the support at the same speed; means for supplying current of a frequency of about 50,000 cycles per second or higher and for causing same to flow on said edge and on the surface of said support to heat same to welding temperature upon reaching said point; means for applying pressure to the so-folded metal strip to bring said strip edge and said surface into welded engagement at said point; and means for thereafter applying pressure to the advancing strip in directions to force longitudinally-extending portions of the thicknesses which constitute same into spaced-apart relation, while same remain secured to said support by reason of said welded engagement.

13. Apparatus for winding a length of metal strip material generally helically about a relatively-rotating and longitudinally-advancing metal support while welding same on edge to said support, such apparatus comprising: means for folding a metal strip upon itself with the surfaces of the folded portions in mutually-supporting, contacting relation; means for advancing longitudinally the so-folded metal strip and for bringing an edge of the so-folded metal strip substantially tangentially into engagement with said support at a weld point, and thereby forming the strip material into helical convolutions; means for supplying current of a frequency of about 50,000 cycles per second or higher and causing same to flow along on said edge and on the surface of said support opposed to said edge in advance of said point to heat same to welding temperature upon reaching said weld point; means for applying pressure to the so-folded metal strip to there bring the strip material and support into welded engagement; and means for thereafter applying pressure to the formed convolutions in directions to force at least portions of the two-thicknesses which constitute same into spaced-apart relation, while same remain secured to said support by reason of said welded engagement.

14. Apparatus for forming tubing and welding same to a support therefor which comprises: means for folding a metal strip upon itself along a median line with the surfaces of the folded portions in mutually-supporting, contacting relation; means for longitudinally advancing the so-folded metal strip while also advancing said support into contact at a weld point with the edge portions of said advancing strip opposite from said line; means for providing a high frequency source of current and for causing same to flow in advance of said weld point to heat the contacting portions to welding temperature; and means for thereafter applying pressure to the so-folded metal strip and hence the regions on the strip along adjacent said fold line and in a direction toward the support, thereby to force portions of the strip into spaced-apart relation and into a tubular cross-sectional shape, while leaving in contact with each other portions of the two thicknesses thereof which are adacent to and welded to the support.

References Cited
UNITED STATES PATENTS

| | | | |
|---|---|---|---|
| 2,765,152 | 10/1956 | Hagby et al. | 219—107 |
| 2,473,634 | 6/1949 | Brown | 219—107 |
| 2,965,744 | 12/1960 | Büsse | 219—107 |
| 3,047,712 | 7/1962 | Morris | 219—107 |
| 3,053,971 | 9/1962 | Büsse | 219—107 |
| 3,319,040 | 5/1967 | Rudd | 219—107 |

RICHARD M. WOOD, *Primary Examiner.*

W. DEXTER BROOKS, *Assistant Examiner.*

U.S. Cl. X.R.

219—78, 103, 105